United States Patent
Vachhani

(10) Patent No.: US 10,740,632 B2
(45) Date of Patent: Aug. 11, 2020

(54) OCCUPANT DETECTION SYSTEM AND METHOD FOR TRANSPORTATION VEHICLE

(71) Applicant: Robert Bosch GmbH, Stuttgart (DE)

(72) Inventor: Pooja Vachhani, Canton, MI (US)

(73) Assignee: Robert Bosch GmbH, Stuttgart (DE)

( * ) Notice: Subject to any disclaimer, the term of this patent is extended or adjusted under 35 U.S.C. 154(b) by 31 days.

(21) Appl. No.: 15/898,793

(22) Filed: Feb. 19, 2018

(65) Prior Publication Data

US 2019/0258879 A1 Aug. 22, 2019

(51) Int. Cl.
*H04N 7/18* (2006.01)
*G06K 9/00* (2006.01)
*G06Q 50/30* (2012.01)
*G06T 7/00* (2017.01)

(52) U.S. Cl.
CPC ..... *G06K 9/00838* (2013.01); *G06K 9/00362* (2013.01); *G06Q 50/30* (2013.01); *G06T 7/00* (2013.01); *G06T 2207/10048* (2013.01)

(58) Field of Classification Search
CPC ............... B60H 1/00742; B60N 2/002; B60R 21/01534
See application file for complete search history.

(56) References Cited

U.S. PATENT DOCUMENTS

| | | | |
|---|---|---|---|
| 3,997,866 A | 12/1976 | Taylor et al. | |
| 4,336,522 A | 6/1982 | Graham | |
| 4,528,679 A | 7/1985 | Shahbaz et al. | |
| 5,584,096 A * | 12/1996 | Aurora | B60N 3/02 16/421 |
| 5,920,057 A | 7/1999 | Sonderegger et al. | |
| 6,517,106 B1 * | 2/2003 | Stanley | B60N 2/002 280/735 |
| 6,766,036 B1 | 7/2004 | Pryor | |
| 7,155,317 B1 * | 12/2006 | Tran | H05B 47/105 700/259 |
| 7,880,767 B2 * | 2/2011 | Chinigo | G08B 17/00 348/148 |
| 9,282,297 B2 * | 3/2016 | Siann | H04N 7/183 |
| 2009/0132128 A1 * | 5/2009 | Marriott | B60R 22/48 701/45 |
| 2014/0074566 A1 | 3/2014 | McCoy et al. | |

(Continued)

FOREIGN PATENT DOCUMENTS

DE 4112934 A1 10/1992
DE 102006030193 A1 1/2008
(Continued)

*Primary Examiner* — Clifford Hilaire
*Assistant Examiner* — Peet Dhillon
(74) *Attorney, Agent, or Firm* — Michael Best & Friedrich LLP

(57) ABSTRACT

A vehicle occupant detection system for a transportation vehicle includes an infrared camera mounted in the vehicle for sensing persons therein. The infrared camera provides a camera signal to an electronic controller. The electronic controller is configured to process the camera signal to determine a number of persons disposed in the transportation vehicle, compare the number of persons to a number stored in memory and provide a number signal to a display for displaying the number of available seats in the transportation vehicle. The infrared camera can be a passive infrared camera that senses thermal images.

17 Claims, 4 Drawing Sheets

(56) References Cited

U.S. PATENT DOCUMENTS

2015/0021389 A1     1/2015  Gravelle
2018/0181128 A1*    6/2018  Urano ................. G01C 21/3617
2018/0304723 A1*   10/2018  Nishijima ............. G01J 5/0806

FOREIGN PATENT DOCUMENTS

| DE | 102010033624 A1 | | 2/2012 |
| --- | --- | --- | --- |
| DE | 102013210027 A1 | | 12/2014 |
| DE | 102014217983 A1 | | 3/2016 |
| DE | 102015219692 A1 | | 4/2017 |
| PH | 12015000149 A1 | | 4/2015 |
| PH | 12015000149 A1 | * | 11/2016 |

* cited by examiner

OCCUPANT DETECTION SYSTEM AND METHOD FOR TRANSPORTATION VEHICLE

BACKGROUND

The present embodiments relate to an occupant detection system and method for transportation vehicles, such as buses and shuttles.

Philippines Patent Pub. PH2015000149A discloses a bus seat occupancy monitoring system that detects open seats with sensors located above the seats. Open seats are displayed on a map of the bus. However, the arrangement does not account for persons disposed on the bus that are not yet seated. Thus, when people are entering the bus, there is uncertainty whether a number of open seats that are illustrated on the display correspond to the number of people on the bus. This may result in more persons entering a bus than there are seats available for use.

SUMMARY

One embodiment is directed to detecting persons entering the transportation vehicle and accounting for their presence essentially immediately to prevent overfilling of the vehicle.

In one embodiment, a vehicle occupant detection system for a transportation vehicle comprises at least one infrared camera mounted in the transportation vehicle for sensing persons located within the transportation vehicle and providing a camera signal, and an electronic controller for receiving the camera signal. The electronic controller is configured to: process the camera signal to determine a number of persons disposed in the vehicle, compare the determined number of persons disposed in the transportation vehicle with a stored number of seats corresponding to a capacity of the transportation vehicle, and provide a number signal to a display for visually displaying the number of available seats in the transportation vehicle.

In another embodiment, a method of monitoring vehicle occupancy for a transportation vehicle comprises infrared sensing of an interior of the transportation vehicle by at least one infrared camera to obtain a camera signal and receiving the camera signal from the infrared camera by an electronic controller. The electronic controller includes a processor and a non-transitory memory. The processor is configured to process the camera signal to determine a number of persons within the transportation vehicle from a thermal image corresponding to persons in the transportation vehicle, compare the number of persons in the transportation vehicle with a total number of seats provided in the transportation vehicle to obtain a number of available seats in the transportation vehicle, and visually display the number of available seats to a passenger entering the transportation vehicle.

In another embodiment, a vehicle occupant detection system for a transportation vehicle comprises at least one infrared camera mounted in the transportation vehicle for sensing persons located within the transportation vehicle and providing a camera signal, and an electronic controller for receiving the camera signal. The electronic controller is configured to: process the camera signal to determine a number of persons disposed in the transportation vehicle, compare the determined number of persons with a stored number corresponding to a capacity of the transportation vehicle, and provide a number signal to a display for visually displaying a number of persons available to enter the transportation vehicle without exceeding the capacity of the transportation vehicle.

Other aspects of the present disclosure will become apparent by consideration of the detailed description and accompanying drawings.

DETAILED DESCRIPTION

Before any embodiments are explained in detail, it is to be understood that the embodiments are not limited in application to the details of construction and the arrangement of components set forth in the following description or illustrated in the following drawings. Other embodiments are capable of being practiced or of being carried out in various ways.

Figure 1:
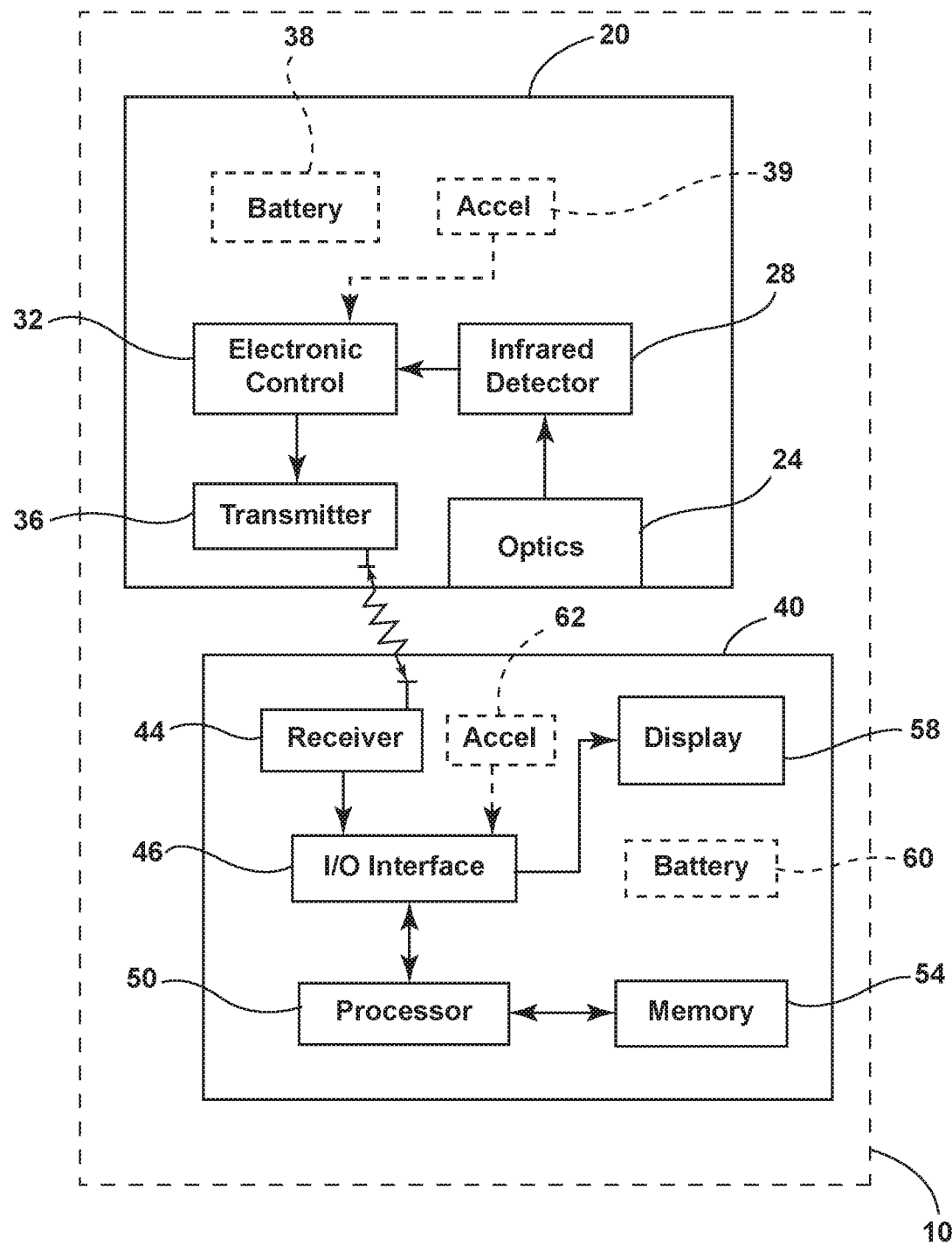
FIG. 1 is a block diagram of a vehicle occupant detection system.

FIG. 1 shows a block diagram of a vehicle occupant detection system 10 for a vehicle. The vehicle occupant detection system 10 includes an infrared camera 20 having optics 24, an infrared detector 28, electronic control 32, and a transmitter 36. In some embodiments, a battery 38 provides power to powered elements of the infrared camera 20. In some embodiments, the infrared camera 20 includes an accelerometer 39 that provides an acceleration signal to the electronic control 32 when the vehicle is in motion. The optics 24 provides an infrared light to the infrared detector 28. The infrared detector 28 is a CMOS sensor or other type of infrared sensor that provides sensor outputs to the electronic control 32. The thermal wavelengths detected are as long as 14,000 nanometers (14 µm) in some embodiments. The infrared camera 20 is a passive infrared camera that detects thermal images in one embodiment. The electronic control 32 processes and transmits wireless camera signals via the wireless transmitter 36. In one embodiment, the transmitter 36 is a radio frequency (RF) transmitter. Other transmission modes are contemplated.

The vehicle occupant detection system 10 shown in FIG. 1 also includes an electronic controller 40 including a wireless receiver 44 for receiving a wireless camera signal, an input-output (I/O) interface 46, a processor 50, a non-transitory memory 54, and a display 58. The display 58 is integral with the electronic controller 40 in one embodiment. In some embodiments, a battery 60 is provided for supplying power to the powered elements of the electronic controller 40. In another embodiment, an accelerometer 62 determines whether the vehicle is moving. The receiver 44 provides camera signals to the processor 50 via the I/O interface 46. In one embodiment, the receiver 44 is a radio frequency (RF) receiver. The processor 50 communicates with memory 54 and provides outputs to the display 58.

Figure 2:
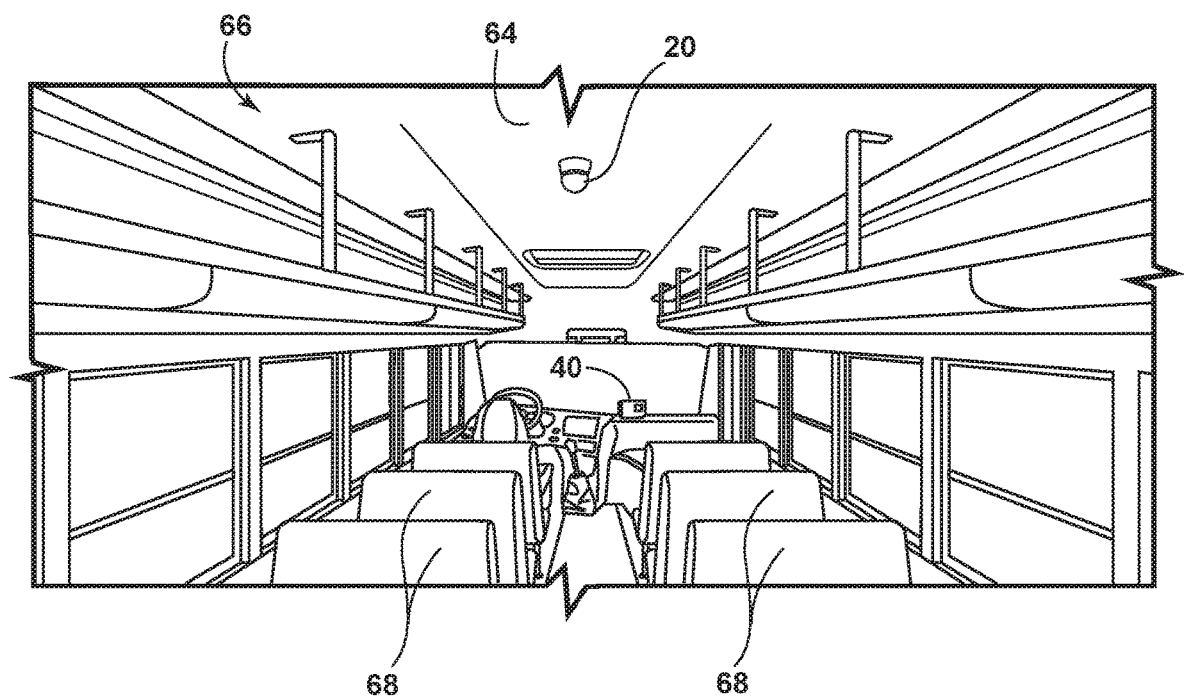
FIG. 2 is a perspective partial view taken within a vehicle of an infrared camera mounted to a ceiling of a transportation vehicle having at least three rows of seats.
Figure 3:
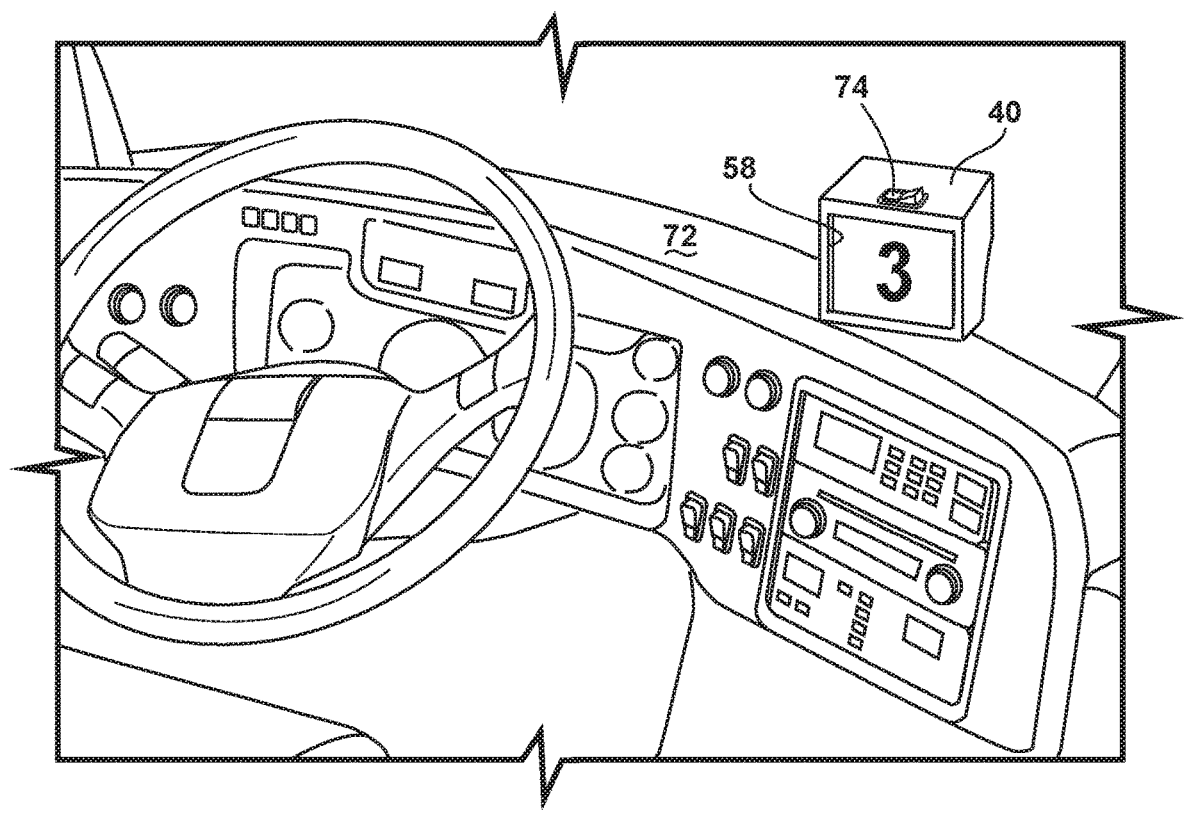
FIG. 3 is a perspective partial view taken within a vehicle of an electronic controller having a display mounted on a dashboard of a vehicle.

FIG. 2 shows the infrared camera 20 secured to the ceiling 64 of a transportation vehicle 66, such as a bus or shuttle. The transportation vehicle 66 includes at least three rows of passenger seats 68. FIG. 3 shows a vehicle dashboard 72 of the transportation vehicle 66 with the electronic controller 40 mounted on the dashboard and having the display 58. In FIG. 3, the electronic controller 40 shows a value "3" on the display 58, meaning that there are three seats available for three additional passengers. As shown in FIG. 3, the display 58 is available for visual viewing by both the vehicle operation and a passenger entering into the transportation vehicle 66. In another embodiment, displays 58 are provided on multiple sides of the electronic controller 40 for displaying a number of available seats. In one embodiment, an ON/OFF switch 74 is provided on the electronic controller 40 so that an operator can completely shut down or power off the vehicle occupant detection system 10.

Vehicle Occupant Detection System Installation

When the vehicle occupant detection system 10 is installed in a transportation vehicle 66, the electronic controller 40 having the display 58 is mounted to a dashboard and the infrared camera 20 is mounted to a ceiling. Mounting can be performed using adhesives, screws or various methods.

The total number of seats or passengers that represents the vehicle capacity, including the driver if the transportation vehicle 66 is not driverless, is entered and provided as a stored number of seats in the memory 54 of the electronic controller 40 for operating purposes by the installer. Thus, an installer operates the user interface 14 for storing the number of seats for the transportation vehicle 66 in the memory 26. Thereafter, the vehicle occupant detection system 10 is prepared for operation in the transportation vehicle.

Operation

Figure 4:
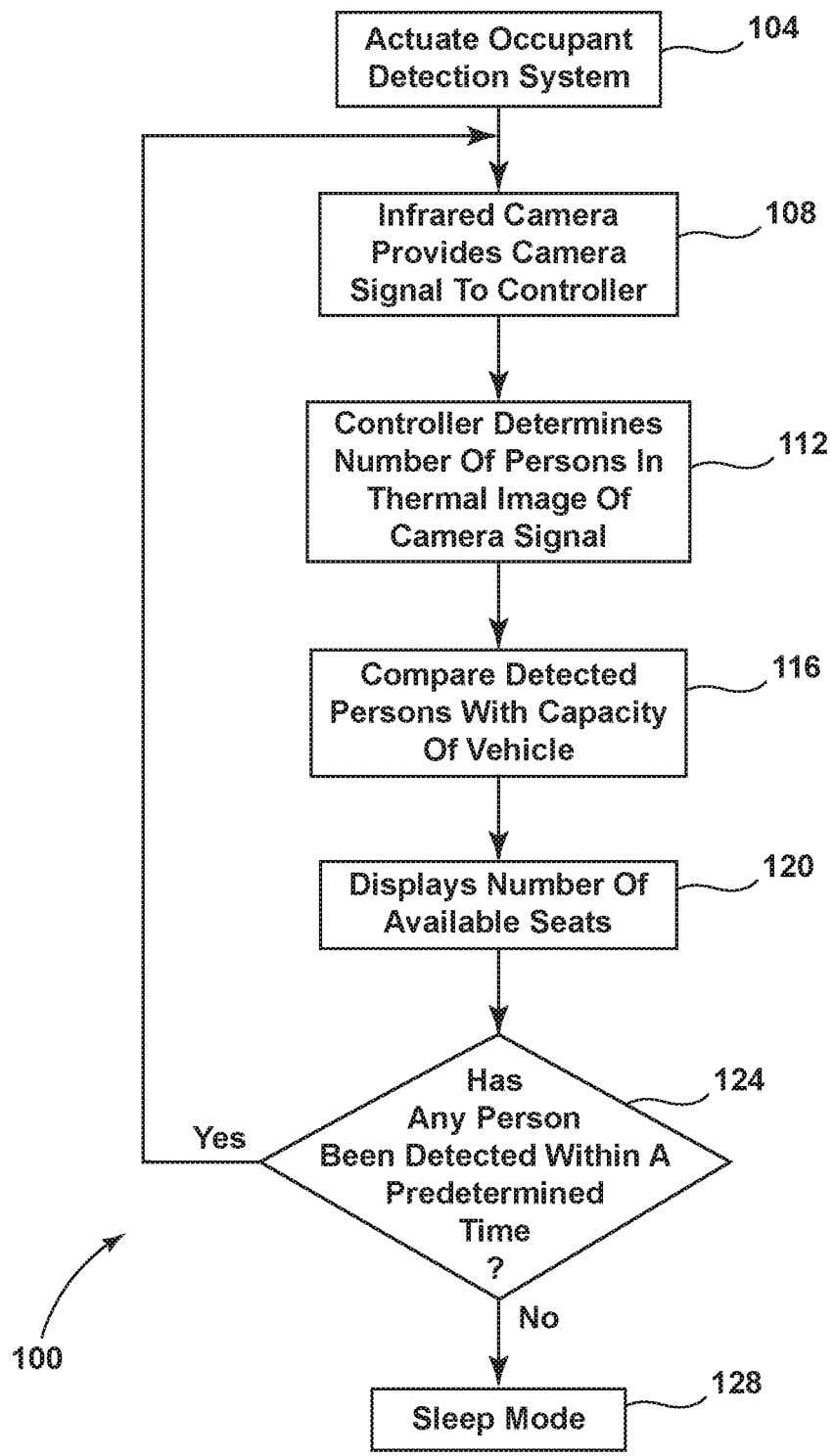
FIG. 4 is a flow chart of an operation of the vehicle occupant detection system.

FIG. 4 is a flow chart 100 for one embodiment. An operator manually actuates the electronic controller 40 and the infrared camera 20 so that the vehicle occupant detection system is operational (step 104).

The infrared camera 20 provides a camera signal to the electronic controller (40) via transmitter 36 (step 108). The camera signal is received by the receiver 44 and provided to the processor 50 via the I/O interface 46. Thermal images of the camera signal are analyzed to detect heat sources corresponding to persons to obtain a determined number of persons located within the transportation vehicle 66 (step 112). The analyzing is performed by the processor 50 and results in the determined number of persons.

The processor 50 is configured to compare the detected number of persons in the transportation vehicle 66 with the capacity of the transportation vehicle (step 116) to determine a number of available seats. Thereafter, the electronic controller 40 visually displays a number signal corresponding to the number of available seats on the display 58 (step 120).

The processor 50 is configured to also process or determine whether any person has been detected within a predetermined time (decision step 124). During usage with a vehicle operator or a passenger on the transportation vehicle 66, the processor returns to operating the infrared camera to obtain a camera signal (step 108). In the event that the transportation vehicle 66 has been abandoned by the operator and passengers and no person is detected with the interior of the vehicle for a predetermined or preselected time, the processor 50 advances to a sleep mode (step 128). In the sleep mode, the electronic controller 40 and/or the infrared camera 20 are placed in a sleep mode wherein the infrared camera detects thermal images less frequently and/or the electronic controller 40 processes camera signals less frequently.

In one embodiment, when a person enters the transportation vehicle 66, the infrared camera 20 detects their presence and the electronic controller 40 operates to provide a value changing to one less available seat visually on the display 58. Thus, upon the person entering the transportation vehicle 66, the person realizes that they are accounted for in the number of available seats.

While FIG. 1 shows a transmitter 36 and a receiver 44, in another embodiment, the transmitter 36 and receiver 44 are transceivers that permit two-way communication by both transmitting and receiving signals. In one embodiment, the electronic controller 40 transmits a signal to the infrared camera 20 that a sleep mode is initiated and the infrared camera stops operation or obtains and transmits camera signals less often. When a person is detected by the electronic controller 40 in the sleep mode, the vehicle occupant detection system 10 wakes up. The vehicle occupant detection system 10 then operates, after receiving a camera signal from the infrared camera 20, to show a number of available seats on the display 58 as shown in FIG. 4. The flow chart 100 shown in FIG. 4 is for purposes of illustration and more or few steps and a different order of steps is contemplated.

Accelerometer Embodiment

Another embodiment includes an accelerometer 39 disposed in the infrared camera 20 and/or an accelerometer 62 disposed in the electronic controller 40. The accelerometer 39 in the infrared camera 20 provides an acceleration signal when the transportation vehicle 66 is moving. The electronic control 32 of the infrared camera 20 selectively powers off the transmitter 36 and the infrared detector 28, when the acceleration signal is greater than a predefined acceleration signal corresponding to movement of the vehicle 66 at greater than a predefined velocity.

In some embodiments, the electronic controller 40 includes an accelerometer 62 that provides an acceleration signal when the transportation vehicle 66 is moving. When the acceleration signal is greater than a predefined acceleration signal corresponding to movement of the vehicle 66 at greater than a predefined velocity, the electronic controller 40 operates in a power saving sleep mode, wherein the receiver 44 and other components are not powered.

In another embodiment, the receiver 44 and the transmitter 36 are provided as transceivers, and an accelerometer in one of the infrared camera 20 and the electronic controller 40 provides an acceleration signal that is then transmitted directly or as a sleep mode signal to the other of the infrared camera and the electronic controller.

Non-Seat Embodiment

Another embodiment is directed to embodiments wherein vehicle seats are not necessarily provided in rows throughout the transportation vehicle. In an airport shuttle bus, seats are provided along with space for users to stand and hold a support bar as the transportation vehicle drives along a path. A shuttle bus has a maximum capacity that includes people standing and holding onto a support bar or other support device. Thus, in such an embodiment, an installer provides the electronic controller 40 with a capacity for the shuttle bus. One or more infrared cameras are installed and configured to count persons disposed within the shuttle bus and provide a numeral relating to the remaining capacity of the shuttle bus. In another embodiment, airport shuttles having multiple doors and stand up supports for passenger's to legally stand while driving to a gate or passenger plane are also contemplated.

In operation, the non-seat embodiment operates in a similar manner to the first embodiment, except the capacity of the transportation vehicle, such as a programmed and stored vehicle capacity number is utilized, instead of the exact number of seats in calculating availability.

Additional Features

In one embodiment, the electronic control 32 of the infrared camera is an application specific integrated circuit (ASIC). In another embodiment, the electronic control 32 is an electronic processor, such as a microprocessor, in combination with a non-transitory memory and other circuitry. Both the electronic control 32 and the electronic controller 40 can include multiple processors, additional computer-readable memory, multiple I/O interfaces, and/or additional components or modules (e.g., hardware, software, or a combination thereof).

While FIG. 3 shows a dashboard and a steering wheel for the transportation vehicle 66, in some embodiments an autonomous vehicle is contemplated. The autonomous vehicle determines whether the vehicle is loaded with passengers and/or whether the vehicle should travel to another location.

In one embodiment, the transportation vehicle 66 has multiple doors and multiple infrared cameras 20 for sensing the number of individuals within the transportation vehicle so that the electronic controller 40 can account for individuals exiting or entering one or more of the multiple doors.

While FIG. 1 shows batteries 38, 60 providing power to components of the vehicle occupant detection system 10, in other embodiments, the infrared camera 20 and electronic controller are in communication with a power supply of the transportation vehicle 66.

While one embodiment includes at least three rows of seats, another embodiment includes at least four rows of seats for the transportation vehicle 66. Another embodiment includes at least 20 rows of seats. While one embodiment includes two seats in each row of seats, other numbers of seats, including six seats per row, with a middle aisle separating groups of three seats, are contemplated.

While a single infrared camera 20 is shown, other embodiments include multiple infrared cameras for determining persons on a transportation vehicle 66 that includes at least twenty rows of seats. In one embodiment, the infrared cameras 20 are spaced along the length of the transportation vehicle having multiple rows. One of the infrared cameras 20 is typically in the last row of occupant seats. Further, an additional infrared camera 20 is provided for embodiments wherein the transportation vehicle has multiple entrances/exits. In such an arrangement, the infrared cameras 20 determine thermal images of persons located in different regions of the transportation vehicle 66. The ceiling mounted location of the infrared camera(s) 20 allow(s) the thermal images to detect persons standing close to each other within the transportation vehicle 66. Thus, the total number of persons present in the transportation vehicle 66 is determined, regardless of whether they are sitting/standing, or in any other position. Accordingly, at least one infrared camera 20 is provided. In embodiments with multiple infrared cameras 20, the field of view of the infrared cameras can be changed so that a person is not detected by two infrared cameras. In another embodiment, the infrared sensed thermal images detected my multiple infrared cameras 20 are correlated in space to detect and account for a presence of a person viewed in two or more infrared camera thermal images. Thus, the electronic controller 40 is programmed to count a person sensed in thermal images from two infrared cameras 20 as a single person.

Thus, the embodiments provide, among other things, a method and system for determining a number of occupants or monitoring vehicle occupancy within a transportation vehicle and for displaying a number of available seats for persons entering the vehicle. Various features and advantages are set forth in the following claims.

What is claimed is:

1. A vehicle occupant detection system for a transportation vehicle having passenger seats, comprising:
    at least one infrared camera mounted in the transportation vehicle for sensing persons located within the transportation vehicle and providing a camera signal,
    an electronic controller for receiving the camera signal, the electronic controller configured to:
    process the camera signal to determine a number of persons within the transportation vehicle from a thermal image corresponding to persons in the transportation vehicle,
    compare the determined number of persons disposed in the transportation vehicle with a stored number of seats corresponding to a capacity of the transportation vehicle, and
    provide a number signal to a display for visually displaying a number of available seats in the transportation vehicle,
    wherein a person entering the transportation vehicle is sensed by the infrared camera and views the display changing to a value of one less available seat upon their entering into an interior of the transportation vehicle.

2. The vehicle occupant detection system according to claim 1, wherein the at least one infrared camera is mounted to a ceiling of the transportation vehicle for sensing persons disposed in the transportation vehicle, and wherein the transportation vehicle is a bus or shuttle.

3. The vehicle occupant detection system according to claim 2, wherein the electronic controller includes a processor and a non-transitory memory, the non-transitory memory for storing the number of seats corresponding to the capacity of the transportation vehicle.

4. The vehicle occupant detection system according to claim 2, wherein the infrared camera provides the camera signal as a wireless camera signal.

5. The vehicle occupant detection system according to claim 1, wherein the infrared camera is a passive infrared camera.

6. The vehicle occupant detection system according to claim 1, wherein the display is mounted on a vehicle dashboard for viewing by passengers entering into the transportation vehicle, and wherein the display is integral with the electronic controller.

7. The vehicle occupant detection system according to claim 1, wherein the electronic controller and the infrared camera each include a battery for supplying power thereto.

8. The vehicle occupant detection system according to claim 1, wherein the infrared camera includes a wireless transmitter for transmitting the camera signal, and wherein the electronic controller includes a wireless receiver for receiving the camera signal.

9. The vehicle occupant detection system according to claim 1, the infrared camera including an accelerometer that provides an acceleration signal, wherein the electronic control of the infrared camera selectively powers off a transmitter when the acceleration signal is greater than a predefined acceleration signal corresponding to movement of the transportation vehicle at greater than a predefined velocity, and wherein one or more of the electronic controller and the infrared camera operates in a sleep mode when no person is detected within an interior of the transportation vehicle for a predetermined time.

10. The vehicle occupant detection system according to claim 1, wherein one or more of the electronic controller and the infrared camera is configured to operate in a sleep mode when no person is detected within an interior of the transportation vehicle for a predetermined time, and wherein the transportation vehicle includes at least three rows of passenger seats.

11. A method of monitoring vehicle occupancy for a transportation vehicle passenger seats, comprising:
   infrared sensing of an interior of the transportation vehicle by at least one infrared camera to obtain a camera signal;
   receiving the camera signal from the infrared camera by an electronic controller that includes a processor and a non-transitory memory, wherein the processor is configured to:
      process the camera signal to determine a number of persons within the transportation vehicle from a thermal image corresponding to persons in the transportation vehicle,
      compare the number of persons in the transportation vehicle with a total number of seats provided in the transportation vehicle to obtain a number of available seats in the transportation vehicle, and
      visually display the number of available seats to a passenger entering the transportation vehicle,
   operating one or more of the electronic controller and the infrared camera in a sleep mode when no person is detected within an interior of the transportation vehicle for a predetermined time, wherein the infrared camera is a passive infrared camera, wherein the electronic controller is disposed on a dashboard of the transportation vehicle for viewing by a person entering the transportation vehicle, and wherein the transportation vehicle has at least four rows of seats.

12. The method according to claim 11, wherein the transportation vehicle is an autonomous vehicle.

13. The method according to claim 11, wherein the transportation vehicle has multiple doors and the passive infrared camera senses the number of persons within the transportation vehicle to account for individuals exiting or entering one or more of the multiple doors.

14. The method according to claim 11, wherein the passive infrared camera provides the camera signal as a wireless camera signal and the electronic controller includes a wireless receiver for receiving the wireless camera signal.

15. The method according to claim 11, wherein the passive infrared camera includes an accelerometer that provides an acceleration signal, wherein the method includes an electronic control of the passive infrared camera selectively powering off a transmitter when the acceleration signal is greater than a predefined acceleration signal corresponding to movement of the transportation vehicle at greater than a predefined velocity.

16. The vehicle occupant detection system according to claim 1, wherein the stored number corresponding to the capacity of the transportation vehicle includes both a number of persons for standing in the transportation vehicle and a number of persons sitting in seats provided in the transportation vehicle, and wherein the transportation vehicle is a shuttle bus having multiple doors and stand up supports for standing passengers thereon.

17. A method of monitoring vehicle occupancy for a transportation vehicle passenger seats, comprising:
   infrared sensing of an interior of the transportation vehicle by at least one infrared camera to obtain a camera signal;
   receiving the camera signal from the infrared camera by an electronic controller that includes a processor and a non-transitory memory, wherein the processor is configured to:
      process the camera signal to determine a number of persons within the transportation vehicle from a thermal image corresponding to persons in the transportation vehicle,
      compare the number of persons in the transportation vehicle with a total number of seats provided in the transportation vehicle to obtain a number of available seats in the transportation vehicle, and
      visually display the number of available seats to a passenger entering the transportation vehicle,
   wherein a person entering the transportation vehicle is sensed by the infrared camera and views the display changing to a value of one less available seat upon their entering into an interior of the transportation vehicle.

* * * * *